United States Patent [19]

Ferguson et al.

[11] Patent Number: 4,482,328

[45] Date of Patent: Nov. 13, 1984

[54] AUDIO-VISUAL TEACHING MACHINE AND CONTROL SYSTEM THEREFOR

[75] Inventors: Frank W. Ferguson, 4837 S. 28th St., Arlington, Va. 22206; John F. Shell, Landover, Md.; Steven D. Hale, Vienna, Va.

[73] Assignee: Frank W. Ferguson, Arlington, Va.

[21] Appl. No.: 352,917

[22] Filed: Feb. 26, 1982

[51] Int. Cl.³ .............................................. G09B 7/06
[52] U.S. Cl. ................................... 434/310; 434/321;
434/324; 434/335; 434/316; 369/230
[58] Field of Search ................................ 434/308–310,
434/314–316, 319–321, 324, 325, 335, 337;
369/245, 230

[56] References Cited

U.S. PATENT DOCUMENTS

| | | | |
|---|---|---|---|
| 3,353,280 | 11/1967 | Emde | 434/315 |
| 3,504,445 | 4/1970 | Goldmark et al. | 434/315 |
| 3,721,493 | 3/1973 | Schneiderman et al. | 434/314 |
| 3,733,717 | 5/1973 | Montgomery et al. | 434/315 |
| 4,143,879 | 3/1979 | Wren | 369/245 |
| 4,305,131 | 12/1981 | Best | 273/DIG. 28 |

*Primary Examiner*—Richard C. Pinkham
*Assistant Examiner*—Leo P. Picard
*Attorney, Agent, or Firm*—Jones, Tullar & Cooper

[57] ABSTRACT

An improved audio-visual apparatus for projecting visual information segments carried by a transparency holder in an audio-visual cartridge, and for reproducing corresponding narrative and control information recorded on a movable storage medium carried by the cartridge. The apparatus includes an optical projector for projecting a selected one of the visual information segments onto a screen and a first drive mechanism for supporting the holder and selectively driving it to align specified visual segments with the optical projector. A second drive mechanism supporting the storage medium and selectively moving it independently of the holder to permit reproduction of recorded information is provided, and a playback device is mounted in operative relationship with the storage medium to produce signals corresponding to the stored information. Control information reproduced from the storage medium is fed to a microprocessor which is responsive thereto selectively to operate the first and second drive mechanisms while narrative information is fed to a loudspeaker, whereby selected visual displays and accompanying corresponding audible narrative are produced in predetermined sequences. Manual control selectors is also provided to permit operator response to and modification of the audio-visual program.

25 Claims, 16 Drawing Figures

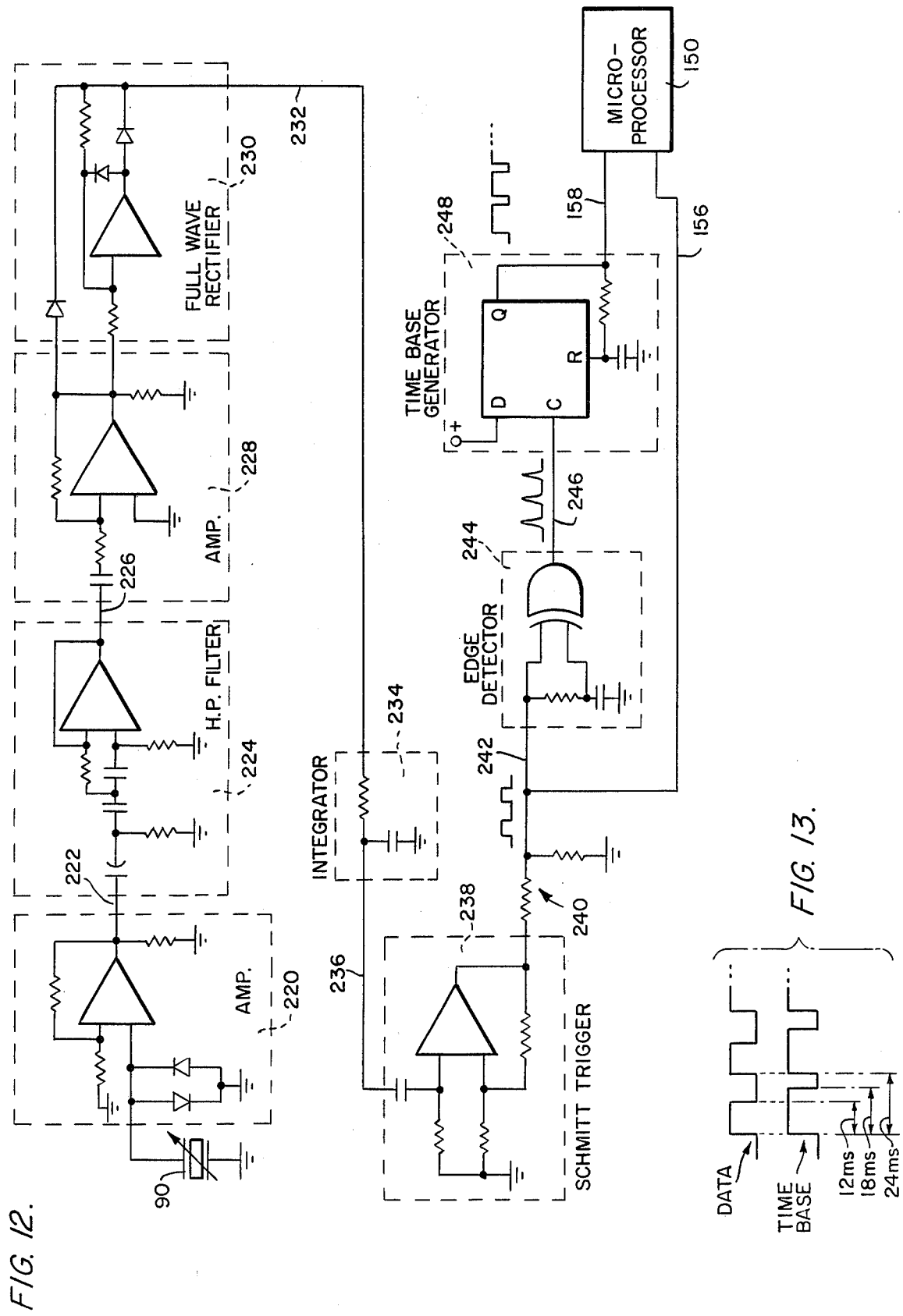

AUDIO-VISUAL TEACHING MACHINE AND CONTROL SYSTEM THEREFOR

BACKGROUND OF THE INVENTION

The present invention relates, in general, to improvements in audio-visual display apparatus, and, more particularly, to audio-visual teaching and testing devices which coordinate the projection of individual picture transparencies with the reproduction of corresponding sound information from a recording.

The uses of audio-visual in entertainment, commercial, and educational fields are well recognized, and such devices are in great demand. Because recent developments have produced light-weight portable, easy-to-use machines, they have come into greater demand, particularly for use with the educationally disadvantaged and in developing countries. Such uses, however, place a premium on reliability, on the ability of a machine to handle a wide variety of functions for more effective teaching and testing of students, on ease of use, and on accuracy in the coordination of visual and audio information. If such machines are to respond to the wide variety of uses to which they may be placed, the machines must have capability for producing a wide variety of visual display and sequences not only in response to predetermined teaching patterns, but in response to the patterns of answers produced by the user of the machine during testing and learning procedures.

Although prior machines have been capable of producing extremely useful displays and accompanying narration, such devices have been limited in the patterns and responses they can provide, primarily because of limitations in the mechanical structure and the control circuitry of such machines. Although prior devices have been generally satisfactory, the increasing need for greater flexibility in establishing desired patterns and programs for instruction or testing, and the need to allow changes in existing patterns and procedures to permit machines to be updated to meet new techniques and theories and to accommodate newly developed programs is now recognized. It is to meet these needs that the present invention was developed.

Typical of prior art machines is that described and illustrated in U.S. Pat. No. 3,504,445 to Goldmark et al, issued April 7, 1970, the disclosure of which is hereby incorporated by reference. The present invention is directed to an improved version of the apparatus disclosed in that patent.

SUMMARY OF THE INVENTION

It is therefore, an object of the present invention to provide an improved audio-visual display machine and control system therefor. Another object is to provide an audio-visual display device which is adapted to provide a program of visual displays and accompanying audible narrative, and wherein the machine has improved features for greater reliability and ease of use and which utilizes a microprocessor control system for flexibility in providing audio-visual programs.

Briefly, the present invention is directed to an improvement over the audio-visual apparatus described and illustrated in the forementioned U.S. Pat. No. 3,504,445. That patent discloses an apparatus for projecting spaced visual information segments carried by a holder and for reproducing sound information recorded on a movable storage medium carried by the holder. The apparatus includes a housing for receiving an audio-visual cartridge which includes the holder and the storage medium. An optical system is mounted in the housing for projecting one of the visual information segments onto a self contained screen. A drive mechanism for the holder is also mounted in the housing, and is adapted for selectively driving the holder to align selective visual segments with the optical projector. Mounted within the holder is a storage medium such as a grooved record, and a drive motor is mounted within the housing to selectively move the storage medium independently of the holder to enable the production of recorded information from the storage medium.

The patent further discloses sound reproducing apparatus including a transducer responsive to the information recorded on the storage medium mounted in the housing for operative engagement with the storage medium and for reproducing such information when the storage medium is moved by its drive mechanism. The recorded material is audio frequency information which includes a narrative portion corresponding to each of the visual segments and control information portions interspersed between the narrative portions. The sound reproducing apparatus responds to this audio information to produce audio frequency signals, the narrative portion of which is fed directly to an audio frequency amplifier and to a loudspeaker. The control information signals, which are in the form of audible tone signals, are fed through a tone separator to activate suitable relays to operate the machine in predetermined modes.

The present invention improves the machine of the Goldmark et al U.S. Pat. No. 3,504,445 through the provision of a microprocessor which responds to control information carried by the storage medium to operate the audio-visual machine in accordance with instructions provided by that control information itself, or in accordance with predetermined procedures, or subroutines, stored in the microprocessor and called up by the control information. In the preferred form of the invention, the control information portions of the audio frequency information carried by the storage medium are in the form of data words interspersed between the narrative portions. As an alternative, the data words may be located at the beginning of the storage medium and stored in the microprocessor memory before the narrative portions are reached. These data words can then be called up by short audio tones intermingled with the narrative portions of the information signals.

The data words are a coded series of audio frequency signal bursts which, after decoding, are used to provide instructions to the microprocessor as required to operate the visual display in a selected pattern, which may be predetermined, or which may vary in accordance with the user's responses to questions, and to operate the storage medium to correspond with the visual display. In the preferred form, the data word is formatted to have a 16 bit recognition pattern to distinguish data signals from the narrative signals, with the recognition pattern being followed by 24 bits of data. This recognition pattern insures that the microprocessor will not be inadvertently activated by the narrative.

A data word can, among other things, select one of the plurality of modes of operation of which the machine is capable. Thus, for example, a data word may instruct the microprocessor to follow a specified subroutine stored in a read only memory (ROM) of the microprocessor, this ROM storage capacity permitting some patterns of operation to be called up by relatively short data words to thereby conserve recording time in the storage medium. Although in a preferred form of the invention some routines will be established within the microprocessor in permanent form, it may be found desirable to provide a read/write memory into which new or modified subroutines can be stored from an external source, such as any specially prepared record medium, to permit new programs of operation to be developed, allowing the machine to be continuously updated, and providing maximum flexibility of operation.

The apparatus of the invention provides two distinct modes of operation, a "teaching" mode and a "testing" mode. For purposes of this disclosure, it will be assumed that a teaching mode refers to essentially automatic operation wherein a predetermined sequence of visual displays is accompanied by a correspondingly predetermined sequence of narratives which correspond to the displays. In this mode, the device proceeds through the entire audio-visual program without modification by the user of the machine. On the other hand, a testing mode, for purposes of this disclosure, may be considered to be an operation wherein a user response is required in the sequence. In such a case, for example, an audible question may accompany a visual display, with a reply by the machine operator being required before the program will advance to the next step. It will be apparent that the response need not be to a question, but the sequence requires some operator participation. In the latter mode, the sequence of visual displays and the corresponding sequence of narrative may be varied in accordance with the particular operator response. Thus, for example, if a question is asked and the response is an incorrect answer, the next visual display may be different than if the answer had been correctly given. It will be understood that a teaching mode may in reality also require operator response, but a distinction between these modes is made herein for purposes of clarity.

To carry out the teaching and testing modes of operation, a variety of subroutines are stored in the read only memory of the microprocessor. Examples of suitable subroutines are as follows:

(a) "Automatic Go To" is a subroutine which selects the visual display required by the received data word. This subroutine does not require a response by the user, but simply activates the visual display holder drive motor to drive the display to the desired location. Optical counter means are provided on the visual display holder for tracking the location of the holder and for providing an input to the microprocessor for use in tracking.

(b) "Response Go To" is a subroutine which requires a correct answer from the user before the visual display is advanced to the next frame selected by the data word. Accordingly the machine operator must respond to a question in a specified manner in order to progress through the program.

(c) "Manual Go To" is a subroutine which responds only to a manually provided "advance" signal which may be produced by means of an advance key on the machine keyboard. This routine prevents the program from advancing until that specific key is activated and does not respond to the "answer" key provided on the machine for use by the operator in responding to specific questions.

(d) "Chapter Header" is a subroutine which responds to the receipt of a data word which identifies the beginning of a section of the storage medium. In a preferred form of the invention, the storage medium and the visual displays may be divided into a plurality of sections with each section relating to a specified subject matter area. Each of the sections, or chapters, may include a number of questions and required responses relating to the chosen subject, with the subroutine keeping track of the number of errors made by the machine operator. If the number of errors exceeds a predetermined number, a prescription indicator may be activated. This indicator may be a flashing light, a message to the user to select another audio-visual cartridge, may refer the user to an instruction book, may produce a reversal of the storage medium to a preceeding chapter, or may provide any other defined function.

A variety of other subroutine modes of operation may be provided as required. For example, a search mode subroutine may be provided to synchronize the visual frames with the audio and to blank out the audio until such synchronization is obtained. This mode may be used each time the system is indexed to a new chapter either manually or in response to a data word instruction. Further, the subroutine may include a "filler" chapter header instruction to enable the machine to present information even if a chapter header data word is missed when the machine is activated. Other available modes may include an unconditional print subroutine which permits information such as the responses made to various questions or the total number of errors made to be printed on a hard copy printer. In addition, various blanking modes may be provided to permit the user to skip certain parts of the audio narrative on the record, depending upon the user's response to prior questions.

In addition to the provision of a microprocessor and the provision of data words on the storage medium, a variety of mechanical refinements have been made in the apparatus described in U.S. Pat. No. 3,504,445. Thus, the visual display device has been modified to accommodate an optical counter which responds to the angular motion of the display to produce a series of output signals, or counts, which are fed to the microprocessor and which provide a precise indication of the visual information segment which is aligned with the projector optics.

The present invention also provides a modified playback adjustment mechanism which permits manual selection of a specified section, or chapter, on the storage medium. This is accomplished by means of a solenoid mounted adjacent the end of the playback device, which in the preferred form is a record tone arm, so that upon activation of the solenoid, the tone arm is lifted from the record and returned to a predetermined position on the storage medium. Deactivation of the solenoid then allows the tone arm to return to the surface of the record. A manual adjustment cam permits relocation of the solenoid so that when it is activated and then released, the tone arm will drop onto a selected portion of the storage medium. It should be understood that this adjustable selector mechanism is provided in addition to the normal tone arm lifting and lowering mechanism which is activated upon insertion of the visual information holder into the machine or its removal therefrom at the conclusion of a program.

A further modification of the device of U.S. Pat. No. 3,504,445 is the provision of decoder circuitry which responds to the audio frequency data word signals produced by the tone arm to convert those signals into a digital form usable by the microprocessor. The decoder further operates to produce a time base pulse train which is supplied to the microprocessor to serve as the time base for pulse recognition of the data signals. This time base reconstruction permits asynchronous operation of the system so that it will function to distinguish the data signals from the narrative signals and background noise.

The microprocessor responds to the data input which it received from the storage medium and from the manually operated control keys to produce output signals which operate the various drive motors, tone arm alignment solenoid, and various LED displays provided on the machine. The displays are provided to indicate which portion of the storage medium is being played, to confirm the visual number being projected on the screen, to indicate the number of errors that have been made by the operator either in a given chapter or cumulatively, and to indicate what action the operator is to take if the permissible number of errors is exceeded. The processor also provides an output to an external jack to which a hard copy printer may be connected to permit the printing of a permanent record of, for example, responses made by the machine operator. If desired, this output may also be connected to a programmable hand-held calculator for storage of such information and subsequent determination of patterns of errors and other information relating to the learning ability of the operator.

Thus, the present invention provides a portable, compact, audio-visual machine which is simple to use, is reliable, and which may be used for a variety of learning and teaching functions. The device provides much greater flexibility than prior devices through the use of a microprocessor and the provision of data words on the storage medium used in the audio-visual machine, which data words provide instructions and programs to the microprocessor which are carried out by subroutines stored within the processor. This unit permits an automatic change between testing and teaching modes through the use of data word instruction rather than by manual switching, and permits, through the storage of various subroutines, much more complex operation than was previously possible with machines of this type to thereby provide a greatly improved teaching and testing environment. The improved tone arm assembly and the provision of optical position sensing, together with the circuitry provided to operate the microprocessor and the tone arm positioning mechanism, all cooperate to provide the various features and advances of the invention.

BRIEF DESCRIPTION OF THE DRAWINGS

The foregoing and additional objects, features and advantages of the present invention will be more clearly understood from a more detailed consideration of the invention as set forth in the following description thereof, taken in conjunction with the accompanying drawings, in which:

FIG. 4A is a partial top view of a modified form of the cartridge of FIG. 2 for use with the detector of FIG. 4;

FIG. 12 is a circuit diagram of the decoder of FIG. 11;

FIG. 13 is a graphical illustration of the time base and data pulses supplied to the microprocessor;

DESCRIPTION OF PREFERRED EMBODIMENTS

Figure 1:
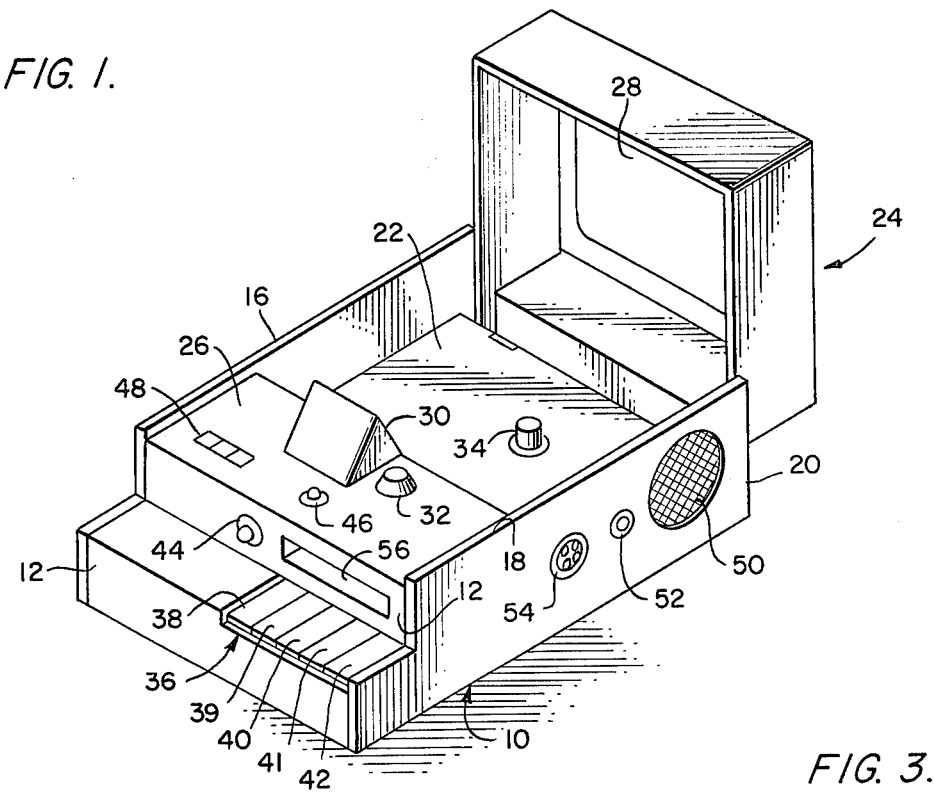
FIG. 1 is a perspective view of an audio-visual machine incorporating the features of the present invention.

Turning now to a more detailed consideration of the invention, there is illustrated in FIG. 1 a perspective view of one preferred form of an audio-visual machine constructed in accordance with the principles of the present invention. The machine is similar to that illustrated in U.S. Pat. No. 3,504,445, and thus includes a casing 10 having a front wall 12, a bottom wall 14, side walls 16 and 18 and a back wall 20. The casing incorporates a recessed top wall 22 which extends between the front, back and side walls and which cooperates with the bottom wall 14 to provide an enclosure for the mechanism to be described and for the electronic control circuitry. A cover 24, shown in its upright position, is hingedly mounted to the back wall 20 of the casing and when closed covers the area defined by the top wall 22. The cover may be secured in its closed position and opened to its upright position in any conventional manner.

Mounted inside cover 24 is a projection screen 28 onto which visual displays are projected by means of an optical system 30 including a telescopically adjustable lens whose vertical movement is controlled by a focusing knob 32, as described in the aforesaid U.S. Pat. No. 3,504,445.

Mounted on the top wall 22 is a chapter selector knob 34 which permits manual adjustment of the position of the playback mechanism for the storage medium to be described.

Extending across the face of the casing 10 are a plurality of manual control keys 36 for manually controlling the operation of the device and for use by the machine operator in selecting answers to questions posed during the teaching program to be described. Switches 38 to 42 are described in detail in the aforesaid Goldmark et al patent and need not be further described.

A ready lamp 44 is mounted on the front wall of the device to indicate when the operator is required to perform some function such as, for example, depressing the "advance" button 38 to initiate a program, or depressing one of the answer buttons 39, 40, 41 or 42 after a question has been posed during a test mode of operation. An "error" lamp 46 is mounted on the top plate 26 and is illuminated whenever the operator depresses an answer button which does not correspond to the correct answer to the question posed by the machine program. Also mounted on the top plate 26 is a display unit 48 (FIG. 14) which provides a visual readout of the chapter being processed in the audio-visual program, of the number of errors made during that program or cumulatively over several programs, and of the procedures to be followed by the operator in the event a predetermined number of errors has been exceeded.

A loudspeaker 50 is mounted in the sidewall 20 of the casing 10 and is coupled to the electronics within the casing. In addition, a jack 52, also mounted in sidewall 20, may be provided to receive the plug of a conventional headset for use by an individual operator. An additional jack 54 may be provided for connecting peripheral equipment such as a hard copy printer, a hand-held calculator, or such other processing equipment as may be desired for evaluation of the operator's response to the particular program being played and for provision of permanent records, where desired. Conventional AC power may be supplied to the device by way of a power cord (not shown) or, if desired, the device may be made completely self contained by the provision of a suitable battery pack (not shown) of conventional design.

The front wall 12 includes a slot 56 adapted to receive an audio-visual cartridge 58 (FIG. 2) of the type described in the Goldmark et al patent and reference is made to the disclosure thereof for details of this structure. The structure of cartridge 58 is similar to that of the aforesaid patent and thus includes a transparent disc portion, preferably formed of plastic, for retaining a plurality of circumferencially spaced visual information segments such as photographic transparencies 60. This holder portion also secures and holds captive an independently rotatably storage medium such as a grooved record disc 62. In a typical embodiment of the invention, the cartridge 58 carries 52 spaced 16 mm film segments. Recorded in the grooves of the record 62 are audio narrative information portions, each narrative portion, together with the operator's response pattern, corresponding to a selected film segment. In addition, the record includes a plurality of control information portions comprising data words in the form of audio frequency bursts in coded form. These data words are interposed between each of the narrative portions, in the preferred form of the invention, although in some applications it may be desirable to locate the data words at the beginning of the recording, or, where the various visual segments and corresponding narrative portions are grouped into chapters or other divisions, between such chapters or divisions.

Figure 3:
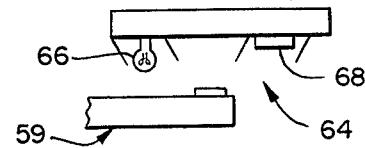
FIG. 3 is a diagrammatic illustration of an optical detector for use in determining the angular position of the transparency holder of FIG. 2.

In the Goldmark et al patent, the bottom surface of the transparency holder is provided with a series of detents which are adapted to operate corresponding microswitches to identify the rotational position of the holder, and thus to identify which transparency is being displayed by the optical system. Since the audio portion of the program being played corresponds to the transparency being shown, the microswitch arrangement also serves to identify the correct answer to the questions being posed by the audio portion of the program. Thus, when the operator manually depresses one of the four answer buttons for the device, the operation of that switch can be quickly compared with the correct answer microswitch operated by the detents formed on the transparency holder. However, this use of microswitches introduces a possible area of failure, and accordingly the present invention provides a modification of the rotational position sensing mechanism. This is accomplished by means of an optical sensor 64 (FIG. 3) which incorporates a light source 66 and a cooperating photocell 68 mounted, for example, adjacent one surface of the cartridge 58. The cartridge carries an optical code which, for example, may consist of an alternating series of reflective and nonreflective areas around the periphery of the cartridge. Light from lamp 66 is reflected by the mirror portion of the optical code onto the photocell 68 to produce a corresponding first level signal, while light is either not reflected or is reflected at a substantially lower level from the alternate nonreflecting portions of the surface to produce a second level output from the photocell. The alternating output levels provide a pulse train which may be fed to a counter which then produces a count indicative of the angular position of the cartridge holder 59. This angular position provides a unique identification of the transparency 60 which is aligned with the projector optics for display on screen 28.

Figure 2:
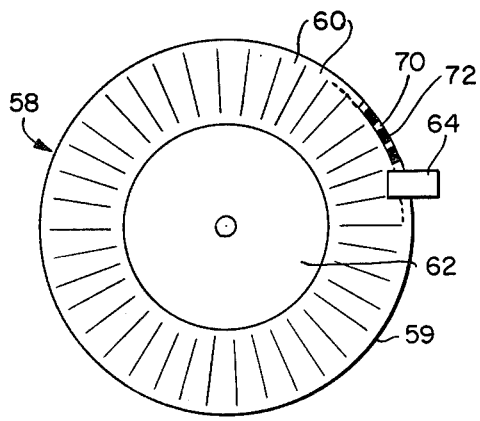
FIG. 2 is a plan view of an audio-visual cartridge including a transparency holder and a storage medium for use in the machine of FIG. 1.

Although FIG. 2 illustrates a cartridge having a simple optical code consisting of angular segments having opposite optical characteristics (i.e. reflective or nonreflective), it will be apparent that a more complex optical code may be provided if desired to permit an accurate determination of the angular position of the holder without the need for returning the cartridge to an initial starting position and thereafter maintaining a count of the optical markers which pass by the detector 64 during rotation of the holder. However, such rotational position indicators utilizing optical codes are known in the art and further explanation is not believed to be required.

Figure 4:
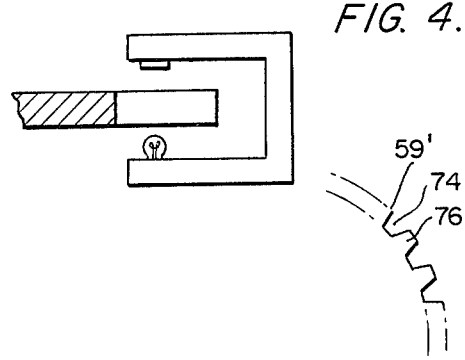
FIG. 4 is a modified form of the optical detector of FIG. 3.

Although the use of alternating reflective and nonreflective segments 70 and 72 provide satisfactory results, it may be desired to utilize a sensor of the type illustrated in FIG. 4, wherein the circumference of holder 59 is provided with a series of opaque and transparent segments, and an optical sensor 64' is utilized to detect the rotational position of the holder. In this case, the optical sensor utilizes a lamp 66' and a photocell 68' located adjacent the bottom and top surfaces of the holder 59 whereby the transparent portions 74 (FIG. 4A) permit light to pass through the holder from the light source 66' to the photocell 68' to produce an output signal, and where the opaque portions 76 prevent the passage of light. Accordingly, the output from the photocell is a series of pulses which may be fed to a counter to provide an indication of the angular position of the holder. (see FIG. 4)

As will be explained in greater detail hereinbelow, the output signals from the optical detector 64 are used to identify which visual segment is being displayed by the machine. The microprocessor, to which this information is supplied, then determines which response by the operator of the machine is the correct one. This determination may be based on information placed in storage in the microprocessor by means of a data word on the cartridge 58 currently in use or may be information previously placed in memory. This combination of the optical position detection and the use of data word storage of the responses, or answers, required from the operator not only serves to eliminate the need for the microswitches used in the prior art, but provides a more versatile educational tool capable of analyzing the pattern of operator response, not just a single response.

As indicated above, in the preferred form of the present invention, the movable storage medium 62 is a grooved record disc which has recorded on it narrative information corresponding to selected film segments as well as control information in the form of data words, both recorded at audio frequencies on the record disc. This information is obtained from the disc by means of a playback device in the form of a tone arm 80 of conventional construction which is supported at one end by a stanchion 82 carrying a vertical pin 84 around which the tone arm 86 is free to rotate in a horizontal plane. The tone arm is mounted to pin 84 by means of a horizontal pin 88 to permit vertical motion of tone arm 86. The opposite end of the tone arm carries a suitable pickup head 90 which typically includes a stylus adapted to engage the grooves in the record. Because the tone arm assembly 80 is of conventional construction, the control and drive mechanisms for the arm, which function to position it on the record when a cartridge is inserted into the machine and to be lifted away from the record at the end thereof, are also conventional and need not be described herein.

Figure 6:
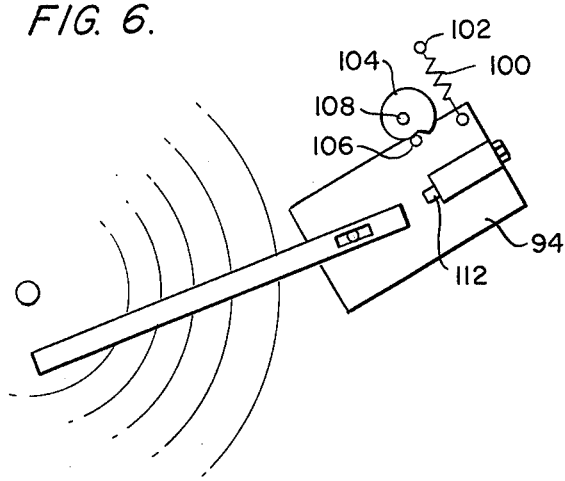
FIG. 6 is a top view of the positioning device of FIG. 5.

In accordance with the present invention, the conventional tone arm assembly 80 illustrated in Goldmark et al patent is modified by the provision of an automatic positioning assembly 92 which is energizable to locate the tone arm 86 at a predetermined position on the record 62. The assembly 92 includes a support plate 94 pivotally mounted to a frame assembly 96 which forms a base for the mechanical structure of the tone arm assembly and its related mechanism. The plate 94 is supported on a vertical pivot shaft 98 for horizontal motion generally in a plane parallel to the plane of the record disc 62. As illustrated in FIG. 6, plate 94 is biased by means of a spring 100 connected between a fixed pin 102 and the plate 94 to rotate in a counterclockwise direction about pivot 98. The rotational position of plate 94 is adjustable by means of a cam 104 having a cam surface which abuts a follower stud 106 secured to plate 94. Cam 104 is mounted on a vertical shaft 108 which, in the preferred form of the invention, is manually rotatable by means of control knob 34 (FIG. 1) to permit manual rotation of plate 94.

Mounted to the top surface of plate 94 is a solenoid 110 having a armature 112. Since the solenoid is fixed to plate 94, it rotates about pivot 98 in accordance with the position of cam 104.

Figure 5:
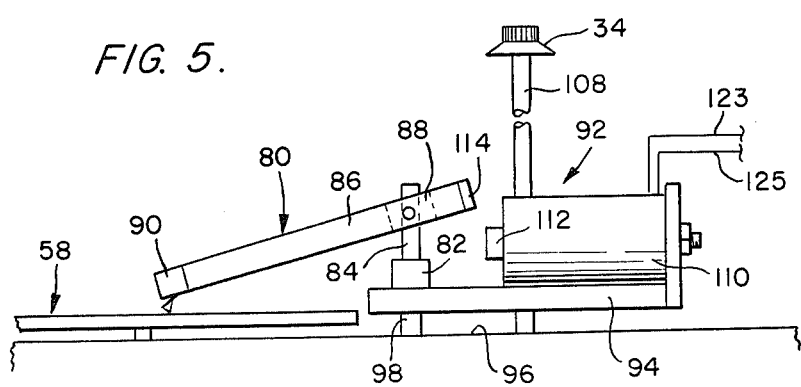
FIG. 5 is a side view of a tone arm positioning device for the apparatus of FIG. 1.

As seen in FIG. 5, when tone arm 86 is in the playback position, with the stylus portion of the pickup head 90 engaging the surface of record 62, the rearward end 114 of the tone arm extends about the axis of the electromagnet and its armature 112. Similarly, as seen in FIG. 6, as the tone arm 80 moves along the record, the axis of the tone arm forms an angle with respect to the axis of armature 112, and as long as the electromagnet remains deenergized, the tone arm is free to operate in the normal manner.

Upon energization of solenoid 110, end 114 of the tone arm 80 is attracted by the magnetic field produced by the solenoid, and the tone arm tends to align itself with the axis of armature 112. This attraction may be enchanced by the provision of suitable magnetic material at the end 114 of the tone arm 86. It will be evident from FIGS. 5 and 6 that such an alignment of the tone arm with the armature 112 will raise the stylus from the surface of record disc 62 and will, at the same time, swing the tone arm horizontally to align it with a selected groove on the record disc, the particular groove being determined by the position of cam 104, and thus the position of armature 112. Accordingly, by rotating the cam 104 to properly position the solenoid 110 and thereafter energizing the solenoid, the tone arm will be lifted and aligned with a selected groove in the record. Thereafter, deenergization of the solenoid allows the tone arm to return to its playback position with the stylus in contact with the record. This arrangement allows the operator of the device, or in a teaching environment, the instructor, to manually position the tone arm on a record at a desired narrative portion, thereby allowing the instructor to repeat certain lessons, for example, or to otherwise modify the program established by the data words on the record.

Figure 7:
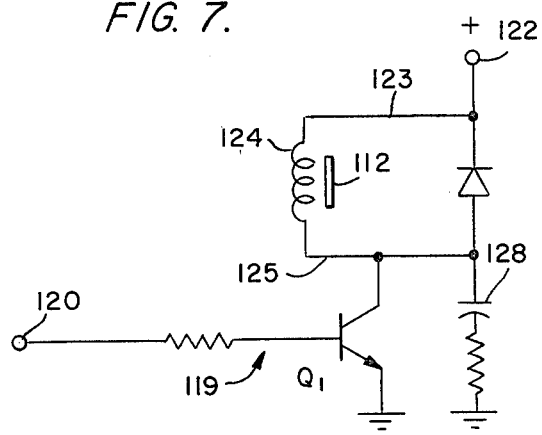
FIG. 7 is a diagram of the circuit used for controlling the operation of the device of FIG. 5.
Figure 8:
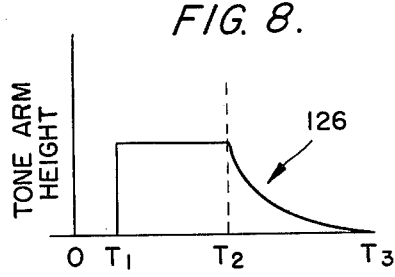
FIG. 8 is a graphical illustration of the motion of the tone arm of FIG. 5 in response to the energization of the control circuit of FIG. 7.

Energization of solenoid 110 is accomplished by means of the repositioning circuit 119 illustrated in FIG. 7, to which reference is now made. This circuit includes a grounded emitter transistor Q1 which, upon receipt of an energization signal at terminal 120, becomes conductive to allow current to flow from a bias source at terminal 112 through lines 123, coil 124 of the solenoid, through line 125, and through transistor Q1 to ground, thereby energizing armature 112. If this occurs at time $T_1$, as illustrated in the graph 126 of FIG. 8, the tone arm will be lifted into alignment with the armature, where it will remain until the end of the energization signal at time $T_2$, when Q1 becomes nonconductive. When Q1 is turned off, a charging current from source 122 through coil 124 flows through capacitor 126, which shunts the transistor. As the capacitor gradually charges, as illustrated on the graph of FIG. 8, the current flow through coil 124 declines between the time $T_2$ and $T_3$, and the magnetic field produced by armature 112 gradually decreases, thereby allowing the stylus to be lowered gently to the record surface.

Figure 9:
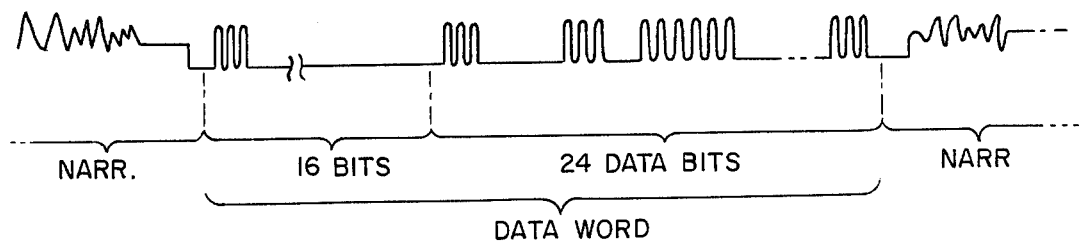
FIG. 9 is a graphical illustration of the audio frequency signals recorded on the storage medium of FIG. 2 and detected by the tone arm of FIG. 5.

As previously indicated, the tone arm 80 serves to reproduce the audio frequency information signals on the record disc, including the data word portions which provide the control information needed for the next following narrative portion or portions. As is conventional, the tone arm stylus converts the audio frequency signals on the record disc to corresponding audio frequency electrical signals of the type generally illustrated in FIG. 9, which represents a data word interposed between two narrative portions. The first narrative portion 130 generally consists of amplitude modulated audio frequency signals which may represent voice signals to be reproduced by the loudspeaker 50 to provide audible instructions or questions concerning a visual display. At the end of the narrative, a data word 132 is provided, the data word comprising, in a preferred form of the invention, a series of constant amplitude tone bursts at a predetermined frequency, resulting in a series of substantially square wave pulses, or data bits, 134. The data bits are arranged in coded pattern to provide the information required by the microprocessor for controlling the operation of the audio-visual machine. In one form of the invention, the data word may consist of 40 data bits, with the first 16 bits providing a recognition pattern for the microprocessor to enable the processor to distinguish between narrative and control signals. This recognition pattern may also include a squelch code which serves to block the audio frequency amplifier, to be described, thereby to prevent the data bits from being fed to the loudspeaker 50. Alternatively, the audio squelch can be activated by a tone burst of a predetermined frequency, (for example 75 Hz) appearing just before the data word.

Following the recognition pattern portions of the data word is a control pattern which consists of 24 data bits providing the required information for tne microprocessor. Such information may include instructing the processor to shift the visual display to the transparency required for the next narrative portion, controlling the drive motor for the turntable to prevent the narrative from starting until the required visual display is in place, establishing in the processor memory the answers to the questions to be asked in the next segment, calling up a subroutine, and providing such other operational instructions as may be required, the exact instructions needed depending upon the previous program of the microprocessor, taken together with the pattern of the operator's response.

At the end of the data word, the record disc will normally be stopped until the visual display holder has been indexed to the desired location, and thereafter the turntable will be restarted to play the next narrative portion 136.

Figure 10:
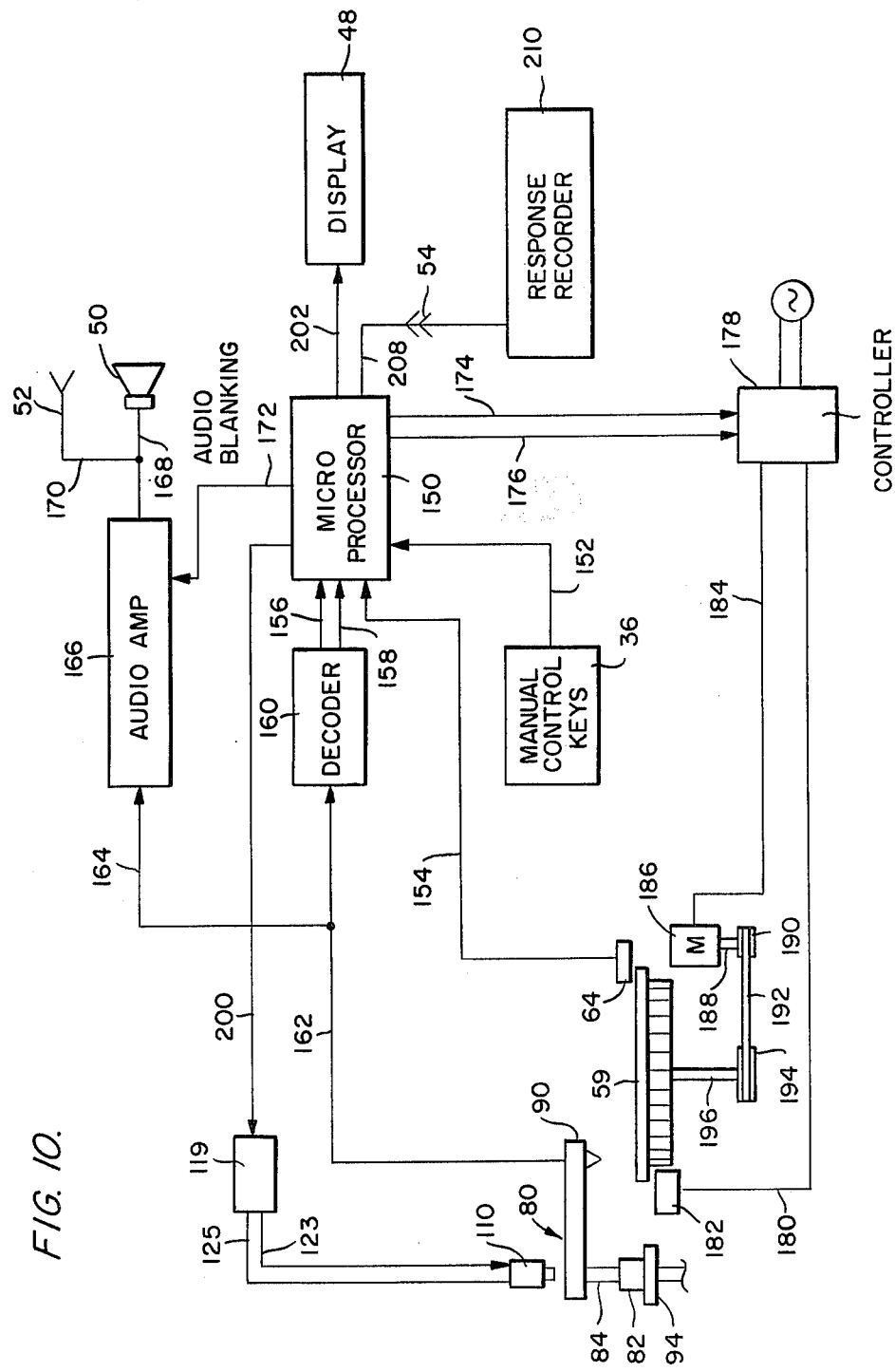
FIG. 10 is a diagrammatic illustration of the control circuitry for the machine of FIG. 1.

It will be noted that the data words not only provide information required for the current operation of the device, but may be also used to call up various subroutines previously stored in the microprocessor in order to carry out desired functions of the apparatus. Some of these subroutines have been previously discussed, and will briefly be described hereinbelow in conjunction with the description of the overall control system illustrated in FIG. 10, to which reference is now made.

Control of the audio-visual machine of the present invention is accomplished by means of a microprocessor 150 which may be any conventional, commercially available, microprocessor having a memory capacity sufficient to accommodate the data word instructions and the various subroutines required for operation of the device. The microprocessor 150 is mounted within the casing 10 of the audio-visual unit and is connected by way of input cable 152 to each of the manual control keys 36, whereby certain instructions as well as answers to questions can be manually entered into the microprocessor. A second input to the microprocessor is provided by means of input line 154 which is connected to the optical sensor 64, line 154 carrying the output from the photocell 68 to the microprocessor for counting and other processing as required.

Additional input signals are supplied to the processor by way of input lines 156 and 158 from a decoder circuit 160 to be described. The signals on line 156 consist of logic pulses (data bits) representing the data words, while the signals on line 158 consist of time base signals for use in reconstructing the data received from record 62. The input to the decoder is the audio frequency coded signal train derived from pickup head 90 of tone arm assembly 80, which signals are supplied by way of line 162 to the input of the decoder. In addition, the audio frequency signals on line 162 are supplied by way of line 164 to a conventional audio amplifier 166, the output of which is supplied by way of line 168 to the loudspeaker 50 and by way of line 170 to jack 52.

The microprocessor 150 responds to the input data on lines 152, 154, 156 and 158 to provide a variety of control signals for operating the audio-visual device. Thus, upon receipt of a data bit recognition pattern from decoder 160 by way of line 156, the processor produces an audio blanking signal on its output line 172 to activate a squelch circuit in the audio amplifier 166, thereby preventing the control data, which consists of burst of audio frequency signals, from reaching the loudspeaker 50. The processor further responds to the input data either directly or by way of a subroutine which is called up by the data to produce output signals on output lines 174 and 176, which signals are applied to a motor controller 178. This controller, which may be in the form of suitable relays or solid state switching, responds to selected output signals to activate, by way of line 180, a suitable advancement mechanism 182 for the transparency holder 59. This advancement mechanism preferably is a ratchet mechanism of the type described in U.S. Pat. No. 3,504,445. When activated, this mechanism advances the holder one step, which is sufficient to align a next succeeding transparency with the projection optics of the audio visual machine for display on screen 28.

The controller 178 also produces an output signal on line 184 which is supplied to a drive motor 186 for a turntable for the record 62. The drive shaft 188 of the motor carries a drive pulley 190 which is coupled by way of a drive belt 192 to a turntable pulley 194. The latter pulley is secured to the turntable drive shaft 196 to drive the record at the desired speed for reproduction of the audio frequency data carried by the record. The controller 178 responds to the microprocessor output to reproduce an audible narrative only after the corresponding transparency is in position for display. In the embodiment where the control data words are located between succeeding narrative portions, the motor continues to operate until the next succeeding data word has been received by the microprocessor, at which time the motor may stop (if necessary) to await the selection of the next visual display. Normally, if the next transparency to be displayed is adjacent the transparency already being displayed, the advancement mechanism 182 will respond sufficiently quickly to allow the drive motor to continue operating and to go into the next narrative portion.

In situations where the narrative includes questions to be answered by the operator, the data word or the subroutine being used may call for the turntable drive motor 186 to be stopped at the end of a question to await the proper response by the machine operator. Thereafter, the motion of the turntable resumes to provide a narration of the next questions, for example, or to proceed to the next control data word.

The microprocessor 150 may also provide, by way of output line 200, an automatic positioning signal for the tone arm assembly 80, which signal is applied to the tone arm control circuit 119 for selective energization of solenoid 110 by way of lines 123 and 125. This circuit permits repositioning of the tone arm assembly 80 when called for either by a data word, by a subroutine, or by the operation of one of the manual control keys, as desired. It will be recalled that the tone arm assembly is manually adjustable so that activation of the repositioning circuit 119 moves the tone arm assembly into alignment with a manually selectable section of the record 62. Accordingly, a selectable portion of the record will be played back after activation and deactivation of the solenoid. This procedure may be used, for example, when the operator of the machine activates two or more wrong answers in a row or when the instructor or teacher desires to repeat a given section or start the program at some point other than the beginning of the record.

Figure 14:
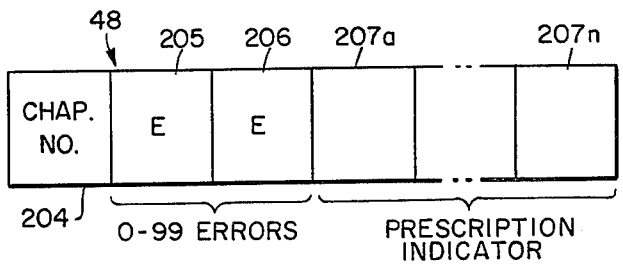
FIG. 14 is a diagrammatic illustration of the display unit of the system of FIG. 1.

A microprocessor 150 also produces output signals on cable 202 which are supplied to the display unit 48 to provide an indication of the machine operation. The display may include several alpha-numeric elements, as indicated in FIG. 14, including a first element 204 which provides an indication of the chapter of the program currently being reproduced. Additional elements 205 and 206 may be provided to illustrate the total number of errors by the operator. Preferably two elements are used for this purpose to permit the system to count from 0-99 errors. This allows the machine to keep track of the total number of incorrect answers given by the operator either during the use of one cartridge or cumulatively during the use of several cartridges. If the total number of errors exceeds a predetermined number, the microprocessor will provide an indication on display elements 207A-207N which will indicate the next action to be taken by the operator. This prescription indication may direct the operator to another chapter within the cartridge being used, which may be selected automatically or by selector 34, or may direct the operator to another cartridge or to an instruction book, for example.

Finally, the microprocessor may provide an output signal on line 208 corresponding to the responses made by the operator to questions asked during the course of the audio narrative. These responses may be supplied to peripherial equipment such as a response recorder 210 which may provide a permanent record of the operator's performance. This permanent recorder may be a hard copy printer, a hand-held programmable calculator, or the like which will provide a record of the operator's responses and which will permit analysis thereof by an instructor.

Examples of the subroutines which may be performed by the audio-visual machine of the present invention are the various modes of operation outlined above. These subroutines preferably are stored in a read only memory (ROM), and thus may be a permanent part of the microprocessor. Alternatively, however, subroutines may be supplied to the processor 150 by means of data word control signals supplied by means of audio-visual cartridges or, if desired, by special audio cartridges designed to supply additional subroutines to the microprocessor. As previously explained, an exemplary subroutine would be an "automatic go to" wherein the processor responds to a data word to select the specific visual display frame indicated in the word. This routine calls for an automatic selection without waiting for any response from the system operator, and thus has no answer code.

Another subroutine preferred for use in the present invention is a "response go to" wherein the selection of the next visual display is delayed until the operator enters a correct answer to a previous question. After the information from the data word has been entered, and the question has been posed by the audio narrative, the record stops and is held until a correct answer is provided.

A third preferred mode of operation is the "manual go to" mode wherein the system responds to the manually activated "advance" control key only. This is a hold function, and neither the narrative nor the visual portion of the program will advance until the "advance" key is activated. This mode provides no response to the various "answer" keys 40-42.

Another preferred mode for use in the present system, may, for convenience, be referred to as a "chapter header". In the formatting of the audio-visual cartridge, it is preferred that the information be divided into various sections, or chapters, which can be identified and specifically selected either manually or by a data word. A chapter may comprise several narrative portions and visual transparencies or may include only one of each, as desired. A chapter usually will include at least one response-type data word which requires operator participation. The beginning of a chapter is identified by a "chapter header" data control word on the record and this word includes chapter header bits which identify the chapter number, a threshold for the number of errors permitted in the chapter before proscription occurs, and such other information as may be prescribed. Immediately following the chapter header bits are bits which identify the "automatic go to" mode which then operates to rotate the transparency holder so that the displayed image corresponds to the data word and thus to the narrative to follow.

Other subroutine modes of operation may be provided as required. For example, a search mode subroutine may be provided to synchronize the visual frames with the audio narration and to blank out the narration until such synchronization is obtained. This mode would be used each time the cartridge was indexed to a new chapter, either manually or in response to a data instruction, and preferably would include a "filler" chapter header instruction to enable the machine to present audio-visual information even if a chapter header data word is missed when the machine is activated. Other modes may include an unconditional print subroutine which causes information such as the responses made by the operator or the total number of errors made, or the like, to be printed on a hard copy printer. This mode could even provide printouts of the data words or any other information concerning the operation of the machine. Other modes may be provided to permit the user to skip certain parts of the audio narration either on the basis of a preprogrammed pattern or in response to answers provided by the operator. Various additional subroutines will be apparent to persons of skill in the art and the foregoing operations are intended to be exemplary, not limiting.

Figure 11:
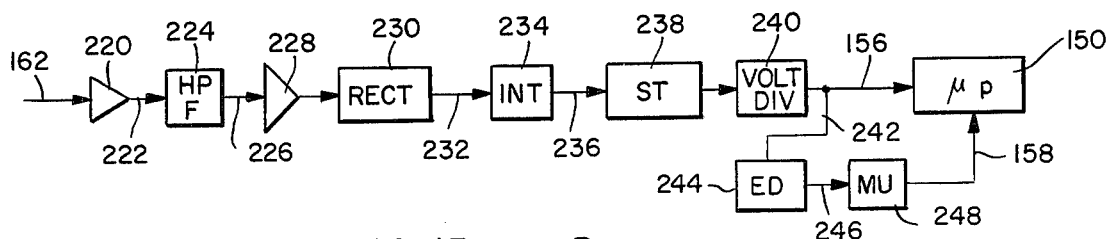
FIG. 11 is a block diagram of the decoder circuit used in the control system of FIG. 10.

In order to accommodate the audio frequency data bits produced by the tone arm assembly 80 in playing back the information on record 62 for use by the microprocessor, the decoder 160 is provided as previously explained. One form of this decoder is illustrated in block diagram form in FIG. 11 and in schematic form in FIG. 12, and reference is now made to these figures. As illustrated, the pickup head 90 carried by the tone arm assembly 80 produces an output signal on line 162 which is represented by the audio-frequency signals of FIG. 9, previously discussed. These signals are supplied to the amplifier 220, the output of which is fed by way of line 222 to high pass filter 224. This filter has a cutoff frequency of about 800 Hz, and its output is fed by way of line 226 to an inverting amplifier 228. The output of the amplifier drives a full wave rectifier 230 which, in turn, produces an output on line 232 that is fed to an RC integrating network 234 which filters and smooths the full wave rectifier output.

The output from network 234 is fed by way of line 236 to the input of a conventional Schmitt trigger network 238. The output from the Schmitt trigger is a square wave pulse which is initiated each time a burst of audio frequency information is received, the trigger circuit then reverting to its initial state after a predetermined period of time, thereby producing data bit pulses of predetermined length and amplitude. The output from the Schmitt trigger is fed through a voltage divider 240 and by way of line 256 to the microprocessor 150. The output is also fed through line 242 to an edge detector 244 which produces, for example, a 100 microsecond pulse on its output line 246 at each level transition of the Schmitt trigger. The output signal on line 246 is supplied to a nonretriggerable monostable multivibrator 248 which produces an output pulse having a pulse width of, for example, 18 milliseconds each time it receives a trigger input on line 246. This output pulse is a time base pulse which is supplied by way of line 158 to the microprocessor 150.

The microprocessor receives the data bit pulses and the time base pulses on lines 156 and 158, respectively, and reconstructs the data word by using the time base signal to define the start of a bit "cell". Any data pulse transitions which occur during a bit cell are considered by the processor to be a logic 1; if no data pulse transitions occur during the bit cell, the data is considered to be a logic 0. This is accomplished by feeding the data pulses on line 156 to an 8 bit counter located in the microprocessor. The leading edge of each time base pulse on line 158 is then used to reset the counter to a count in about the middle of the counter range; for example, a count of 128. Since the time base pulse is 18 microseconds long, the counter cannot again be reset to 128 for at least that length of time.

Immediately upon resetting by a time base pulse, the counter begins to count. It counts up from 128 toward 255 if the logic level of the data pulse on line 156 is high (1), and counts down from 128 toward zero if the logic level of the data pulse is low (0). If the data within a given bit cell contains a 0; that is, has no transitions, then the counter will not change directions, but will continue to count either up or down until at the end of the cell the counter will be at or almost at either its highest available count of 255 or its lowest count of 0. On the other hand, if the data being received is a 1, i.e. a transition of the data signal from its high to its low level or vice versa occurs during the bit cell defined by the time base, the counter will count in one direction (up or down) until the transition occurs, and will then be reversed to count in the opposite direction until the end of the bit cell, at which time the counter will be at or near its original count of 128.

At the end of the bit cell, the microprocessor determines whether the count is approximately 0 or approximately 255, in which case a data word 0 is reconstructed. If it is determined that the count is at or near 128, a data word 1 is reconstructed. If the counts are not near either 0, 255 or 128, then invalid data is being read, and the microprocessor rejects the data. In this way, the asynchronous time base blocks out noise signals which either allow the counter to count too long in one direction or which cause transitions at the wrong time. This blocking can occur because the time base, once it is triggered, is longer than the time required for the desired data transitions, which occur halfway through the time cell. This prevents retriggering of the time base generator by the desired data transition, and blanks out false data.

In the preferred form of the invention, the length of a bit cell is 24 milliseconds, or 12 cycles of a 500 Hz carrier, and since the time base generator is activated by the leading edge pulses from the data signals, the time base generator also has a cycle length of 24 milliseconds, as illustrated in FIG. 13. However, the 18 millisecond length of the time base pulse encompasses the transition time for the data pulse, so that transitions are detected by the counter in the microprocessor. In this way, the system is self-clocking, or asynchronous. Although a particular decoder using an edge detector and multi-vibrator circuit is illustrated, it will be understood that other embodiments are available, and that a microprocessor implementation may be suitable.

The decoder circuit 160 thus serves to reconstruct digital data from the audio tones and to produce level transitions which can be used by the microprocessor for the storage of digital information. This data is stored in a random access memory, and at the completion of receipt of the control data, the microprocessor is activated to carry out the instructions received.

Although the foregoing disclosure illustrates and describes an audio-visual machine wherein visual images are projected onto the face of a screen, it will be apparent that rear-projection optics may also be used, with a slight modification in the arrangement of projector and screen. Such a change would not, however, depart from the overall concepts described and illustrated herein.

Figure 15:
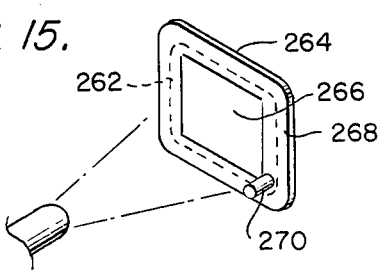
FIG. 15 is a diagrammatic illustration of a further modification of the image projection and optical detector arrangement.

One advantage of a rear projection screen is that the photocell arrangement tracking the position of the film segments carried by the audio-visual cartridge can be made more accurate. This is accomplished in the manner illustrated in FIG. 15, to which reference is now made; and wherein an optical projection device such as lens 260 directs a visual image, indicated by the dotted lines 262 onto the rear of a viewing screen 264. The optical projector receives its image from the film segments carried by the previously-described cartridge, and directs that image through suitable mirrors and lenses for projection. The screen 264 includes a translucent portion 266 through which the image is viewed in conventional manner.

As illustrated, the field of view provided by translucent screen portion 266 is slightly smaller than the projected image 262, so that a part of the image strikes the screen on the surrounding frame portion 268. To permit tracking of the film segments, each segment carries an optical code as a part of its visual image. This code is located at the edge of the film, and is projected outside the field of view, onto the frame 268. A photocell or photocell array surrounded by a collimator tube 270 is mounted on the frame 268 and is directed to receive the projected optical code. Accordingly, as each film frame is projected onto the screen 264, the photocell will provide an output which indicates which frame is being projected. By placing the identifying code on the individual film frame, a more accurate tracking of the visual display is obtained.

Thus, there has been described and illustrated a new and improved audio-visual machine for the projection of spaced visual information segments carried by a holder and for reproducing narrative and control information recorded on a movable storage medium carried by the holder. The described modifications result in a machine that is reliable, easy to use and more flexible than prior machines, thus enabling it to be used in a greater variety of situations, both for teaching and for testing students on a wide variety of subjects. Although the improvements have been illustrated in terms of preferred embodiments thereof, it will be apparent to those of skill in the art that variations and modifications can be made without departing from the true spirit and scope of the invention as set forth in the following claims:

What is claimed is:

1. An improved audio-visual apparatus for projecting spaced visual information segments and reproducing correlated audio information, comprising:

an audio-visual cartridge including a holder securing a plurality of visual information segments and a movable audio information storage medium carrying narrative and control data information in the form of encoded audio frequency bursts, said control data including information and instructions concerning the operation of the audio-visual apparatus in relation to succeeding narrative information;

a housing for receiving said cartridge;

optical means mounted in said housing for projecting one of said visual information segments;

holder drive means mounted in said housing for supporting said holder and for selectively driving said holder to align selected visual segments with said optical projecting means;

storage medium drive means mounted in said housing for supporting said storage medium and selectively moving said storage medium independently of said holder to enable the reproduction of recorded information therefrom;

sound producing means mounted in said housing for operative engagement with said storage medium and for reproducing said recorded narrative and control data information when said storage medium is moved by said storage medium drive means;

decoder means connected to said sound reproducing means to receive said control data information, said decoder means including means for converting said control data to corresponding digital data; and control means including microprocessor means repsonsive to said digital data to operate said holder drive means and said storage medium drive means in accordance with the control data information and instructions carried by said information storage medium.

2. The audio-visual apparatus of claim 1, wherein said narrative information recorded on said storage medium includes a plurality of portions, each portion corresponding to a predetermined visual segment, and wherein said sound reproducing means includes audio means for reproducing said narrative information in audible form.

3. The audio-visual apparatus of claim 2 wherein said control means further includes audio blanking means responsive to said control information for disabling said audio means.

4. The audio-visual apparatus of claim 2, wherein said control information is recorded on said storage medium in the form of data words interspersed between said narrative portions, each data word providing an input to said microprocessor to produce a predetermined operation of said apparatus.

5. The audio-visual apparatus of claim 4, wherein said sound reproducing means further includes:

a supporting staunchion;

a tone arm mounted on said staunchion for horizontal and vertical motion with respect to the surface of said storage medium, electromagnetic means adjacent said tone arm for lifting said arm and positioning it at a predetermined location with respect to said storage medium; and circuit means responsive to said microprocessor for providing a rapid energization of said electromagnetic means to lift said tone arm rapidly, and for providing a gradual de-energization of said electromagnetic means to slowly lower said tone arm onto said record medium at said predetermined location.

6. The audio-visual apparatus of claim 5, further including means for shifting the position of said electromagnetic means whereby de-energization thereof lowers said tone arm at an adjustable location.

7. The audio-visual apparatus of claim 6, wherein said means for shifting the position of said electromagnetic means comprising a tone arm support plate pivotally mounted in said housing, said support plate carrying said electromagnetic means, and means for pivoting said plate to adjust the location of said electromagnetic means with respect to said tone arm.

8. The audio-visual apparatus of claim 7, wherein said means for pivoting said plate comprising cam means.

9. The audio-visual apparatus of claim 7, wherein said means for pivoting said plate comprising manually operable cam means, whereby said tone arm may be manually adjusted for lowering onto a predetermined location on said storage medium.

10. The audio-visual apparatus of claim 1, further including optical counter means responsive to the position of said visual segments to produce output signals which indicate which of said visual segments is aligned with said optical projecting means.

11. The audio-visual apparatus of claim 10, wherein said optical counter means includes segments of alternate optical characteristics on said holder, and photosensitive means responsive to the optical characteristics of said segments for producing said output signals.

12. The audio-visual apparatus of claim 1, wherein said decoder means includes:

trigger means responsive to changes in level in said reproduced control information to produce a train of data pulses;

edge detector means responsive to each level transition of said data pulses to produce a series of trigger pulses; and multivibrator means responsive to said trigger pulses to produce a train of time base pulses, said microprocessor being responsive to said time base pulses to receive said data pulses and to blank out noise in said reproduced control information.

13. The audio-visual apparatus of claim 1, further including optical counter means responsive to the position of said visual segments to produce output signals which indicate which of said visual segments is aligned with said optical projecting means, said optical counter means including optical coding located on said visual segments for projection by said optical projecting means, and photocell means for intercepting said projected optical code.

14. Audio-visual apparatus for displaying visual information segments and for reproducing corresponding sound information comprising:

optical means for producing selected visual information segments;

a storage medium for receiving and storing audio information corresponding to said visual information segments and for receiving and storing control information and instructions concerning the operation of the audio-visual apparatus in relation to succeeding audio information, said control information being in the form of encoded audio frequency bursts;

sound reproducing means for reproducing selected portions of said stored audio information in audible form and for reproducing selected portions of said stored control information;

decoder means connected to said sound reproducing means to receive said control information and to convert it to corresponding digital data;

control means including manual control keys, said control means being responsive to said decoded control information and to the operation of said manual control keys to selectively drive said storage medium information and instructions in accordance with the control and to thereby cause reproduction of selected audio information requiring operator response through manipulation of said manual control keys;

means for coordinating said optical means with said storage medium whereby said visual information segments correspond to said selected audio information; and display means responsive to said control information and to said manual control keys for displaying operator errors.

15. The audio-visual apparatus of claim 14, wherein said audio information stored on said storage medium comprises narrative information corresponding to visual information segments produced by said optical means.

16. The audio-visual apparatus of claim 14, wherein said control information stored on said storage medium comprises data words interspersed between audio information portions, each data word providing an input to said control means to produce a predetermined operation or sequence of operations of said apparatus.

17. The audio-visual apparatus of claim 16 wherein said control means responds to said stored control information to establish a selected sequence of visual information segments and corresponding audible narrative portions, and further is capable of responding to manipulation of said manual control keys in repsonse to said selected audible narrative portions to vary the sequence of either said visual information segments, said audible narrative portions, or both.

18. The audio-visual apparatus of claim 17, wherein said control means further includes microprocessor means responsive to said stored control information and to said manual control keys.

19. The audio-visual apparatus of claim 18, wherein said means for coordinating said optical means with said storage medium comprises indicator means for said optical means, and sensor means responsive to said indicator means for producing an indicator signal.

20. In an audio-visual system, the method of producing selected visual displays and corresponding audible narrative signals, comprising:

providing a plurality of visual information segments;

storing in sequence on a recording medium a plurality of spaced-apart audio frequency narrative protions, each narrative portion corresponding to one of said plurality of visual information segments;

storing on said recording medium in the form of encoded audio-frequency bursts a plurality of audio frequency control data portions each including information and instructions concerning the operation of the audio-visual apparatus in relation to succeeding narrative portions, a first control data portion preceding the first narrative portion on said recording medium and comprising at least one data word for controlling the operation of the audio-visual system, and subsequent control data portions preceding subsequent narrative portions for further controlling the operation of the audio-visual system;

producing from said stored control data portions and said stored narrative portions corresponding output audio frequency signals;

decoding the output audio frequency signals to convert the control data portions thereof to corresponding digital data portions;

supplying said control data output signals to a system controller to regulate the operation of said audio-visual system and to correlate said visual information segments and said narrative portions in accordance with the control data stored on said recording medium; and supplying said narrative output signals to audio output means.

21. The method of claim 20, wherein the step of storing said control data portions and said narrative portions includes grouping said portions into chapter sections, the control data for each chapter section including chapter header data.

22. The method of claim 21, wherein said control data portions and said narrative portions are stored sequentially on said recording medium, the method further including:

modifying, in accordance with the instructions provided by said control data and the responses of the system user, the sequence in which said chapter sections are reproduced.

23. The method of claim 20, wherein the step of supplying said control data output signals to a system controller includes decoding said control data output signals.

24. The method of claim 20, wherein the step of storing control data portions includes storing chapter header data incorporating chapter identification, error threshold and error prescription information for said system controller, the method further including:

storing in said system controller predetermined system operation instructions for selection by said chapter header data.

25. The method of claim 20, further including modifying the regulation of said audio-visual system by said system controller in accordance with operator response to said narrative portions.

* * * * *